Figures 1, 2, 3:
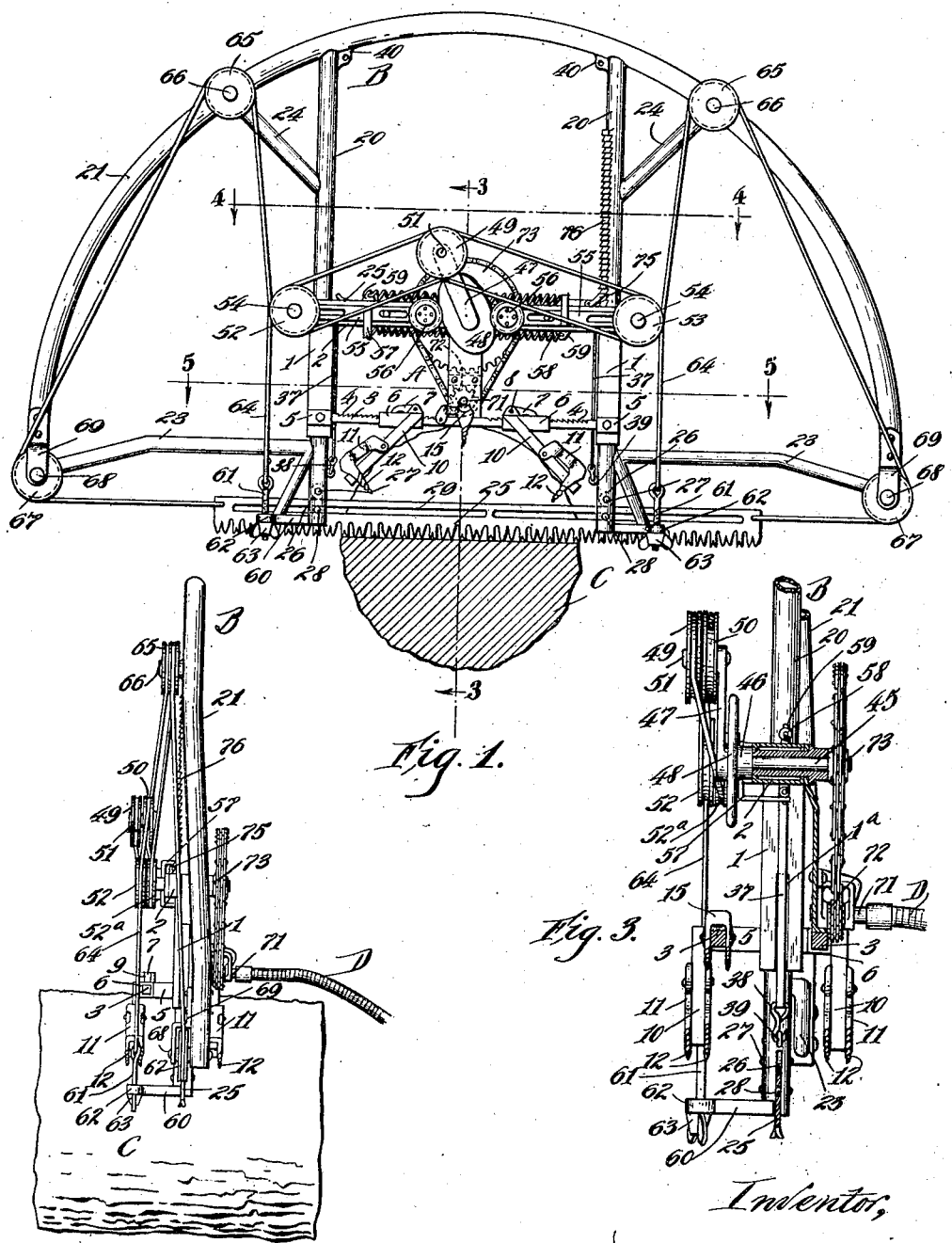

W. B. MILLER.
MECHANICAL MOVEMENT AND APPARATUS EMBODYING THE SAME.
APPLICATION FILED JAN. 28, 1916.

1,246,977.

Patented Nov. 20, 1917.
4 SHEETS—SHEET 1.

Inventor,
Ward B. Miller
By Hull, Smith, Brock & West
Attys.

W. B. MILLER.
MECHANICAL MOVEMENT AND APPARATUS EMBODYING THE SAME.
APPLICATION FILED JAN. 28, 1916.
1,246,977.
Patented Nov. 20, 1917.
4 SHEETS—SHEET 2.
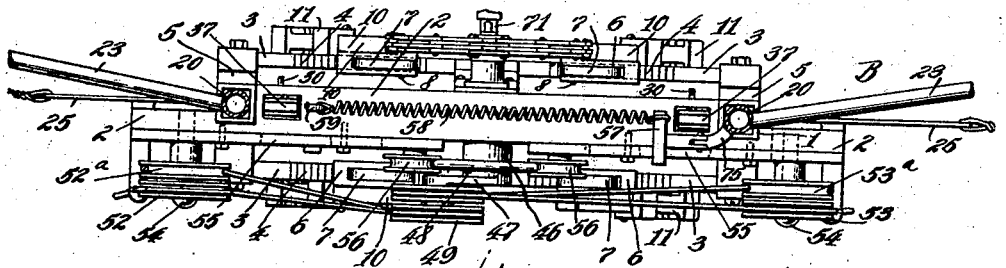
Inventor,
Ward B. Miller
By Hull, Smith, Brock & West
Attys.

W. B. MILLER.
MECHANICAL MOVEMENT AND APPARATUS EMBODYING THE SAME.
APPLICATION FILED JAN. 28, 1916.

1,246,977.

Patented Nov. 20, 1917.

4 SHEETS—SHEET 3.

Inventor,
Ward B. Miller
By Hull, Smith, Brock & West
Attys.

W. B. MILLER.
MECHANICAL MOVEMENT AND APPARATUS EMBODYING THE SAME.
APPLICATION FILED JAN. 28, 1916.

1,246,977.

Patented Nov. 20, 1917.
4 SHEETS—SHEET 4.

Inventor,
Ward B. Miller
By Hull, Smith, Brock & West
Attys.

UNITED STATES PATENT OFFICE.

WARD B. MILLER, OF LAKEWOOD, OHIO.

MECHANICAL MOVEMENT AND APPARATUS EMBODYING THE SAME.

1,246,977.   Specification of Letters Patent.   Patented Nov. 20, 1917.

Application filed January 28, 1916. Serial No. 74,745.

*To all whom it may concern:*

Be it known that I, WARD B. MILLER, a citizen of the United States, residing at Lakewood, in the county of Cuyahoga and State of Ohio, have invented a certain new and useful Improvement in Mechanical Movements and Apparatus Embodying the Same, of which the following is a full, clear, and exact description, reference being had to the accompanying drawings.

This invention primarily relates to a novel mechanical movement for converting a rotary motion into a reciprocatory movement.

The invention further relates to apparatus embodying such movement.

The general objects of the invention are the provision of a mechanical movement of the aforesaid character wherein the zone of activity of the reciprocable element may shift with respect to that of the rotary element while motion is being transmitted from the latter to the former; and the provision of a simply constructed and economically produced mechanism for converting a rotary movement into one of a reciprocatory nature, such mechanism involving few parts and, by its nature, being very durable and efficient.

A further object of the invention is the provision of sawing mechanism, or the like, embodying the aforesaid movement.

While the mechanical movement of my invention is of general adaptability in cases where it is desired to convert a rotary motion into a reciprocatory movement, especially where it is necessary to shift the relative positions of the driving and driven elements while in operation, inasmuch as the same is especially suitable for incorporation in sawing mechanisms, the same will be herein shown and described in such connection.

As will become apparent as this description proceeds, the invention has to do with features of the sawing mechanism, other than the mechanical movement, the nature and scope of the invention being expressed by the claims annexed hereto.

Expressed in more limited terms, the invention may be said to have as certain of its objects the production of a light, strong, and highly efficient sawing mechanism wherein the saw is drawn through the work, thereby permitting a very-thin blade to be used; and wherein no part of the structure interferes with the insertion of a wedge into the saw cut, should such be found necessary; and further, the production of sawing mechanism of a portable, power-driven type which may be conveniently moved from place to place, handled by a single person, and placed in operative relation to vertical objects, such as standing timber, or to logs or other objects lying in a horizontal position.

In embodying my invention in mechanism of the character above expressed, I employ a frame which may be fixed in operative relation to the object to be sawed, and a saw carrying frame movably supported thereby, and I mount the rotary driving element on the first mentioned frame. A pair of opposed flexible power transmitting members are included between the driving element and the saw, and each of said members has one of its ends attached to the saw while its opposite end is anchored at a point fixed with respect to the path of reciprocation of said saw. These members are led about suitable guides whereby a loop is formed in each, and the rotary driving element has a pair of guides about which said loops are engaged and which guides are mounted eccentrically of the rotating axis of the driving element, thereby to lengthen the loop of one member, while permitting the other to shorten, and vice versa, during the rotation of the driving element, and consequently to reciprocate the saw—it being understood, of course, that the aforesaid flexible members are reasonably taut at all times. As will be more readily appreciated after going further into the detailed description of the present embodiments of my invention, it is necessary to include a compensating means or mechanism for taking care of the variations in the effective lengths of the flexible members due to the various angular positions of the driving element during its rotation. It is therefore a further object of my invention to provide a simple and efficient means for this purpose.

Again and more generally, the invention has for one of its objects the provision of sawing mechanism or the like involving a reciprocable element, such constituting the saw in sawing mechanism, and a pair of flexible members each having one of its ends operatively connected with the reciprocable element and its opposite end anchored at a point fixed with respect to the path of reciprocation of said element, and means for taking in or accumulating a part of one member while paying out a like quantity of the other, and vice versa, thereby to reciprocate the aforesaid element.

Figure 9:
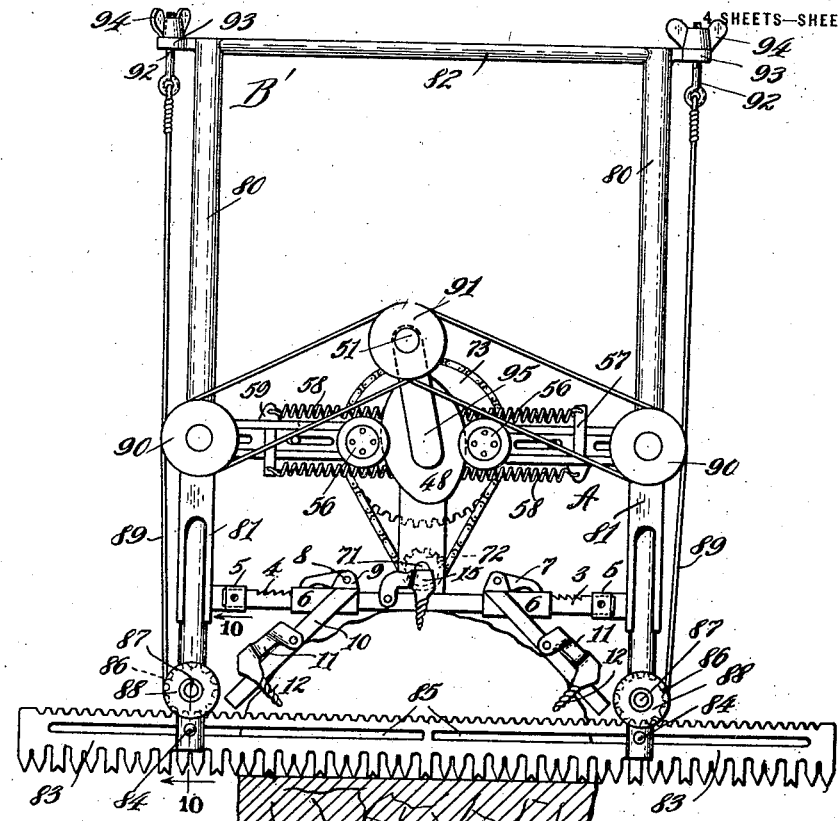
Figure 10:
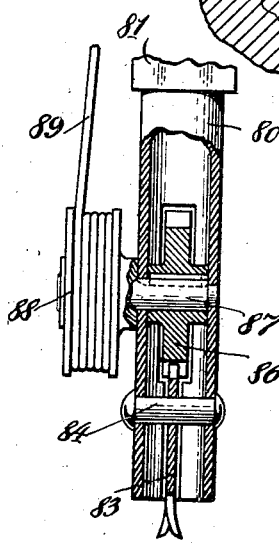
Figure 11:
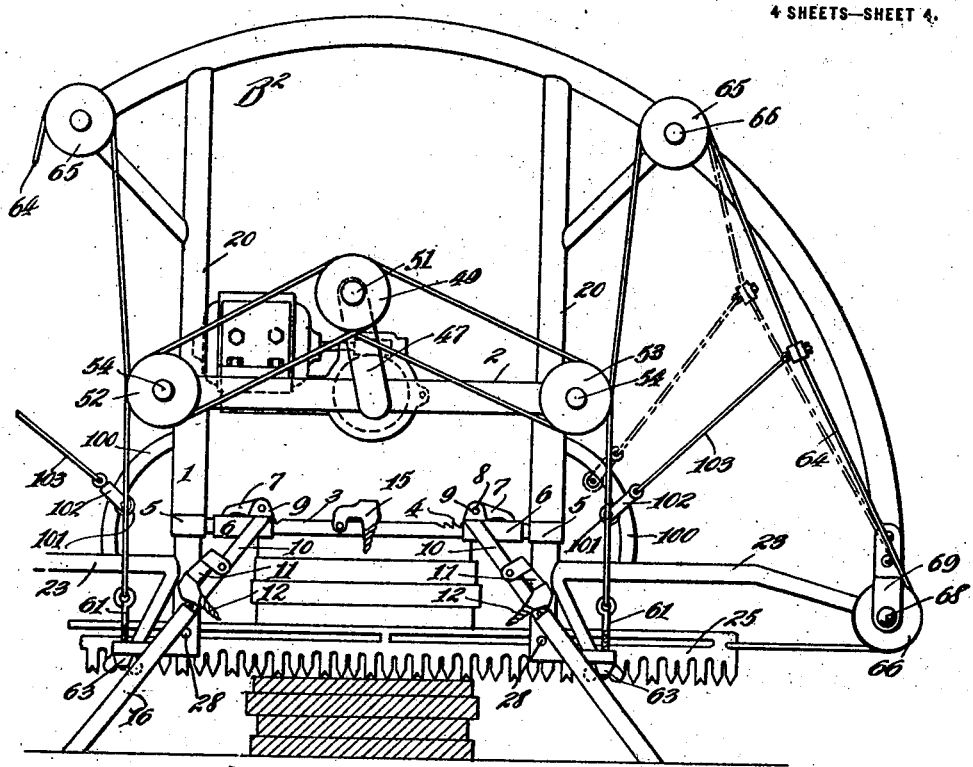
Figure 12:
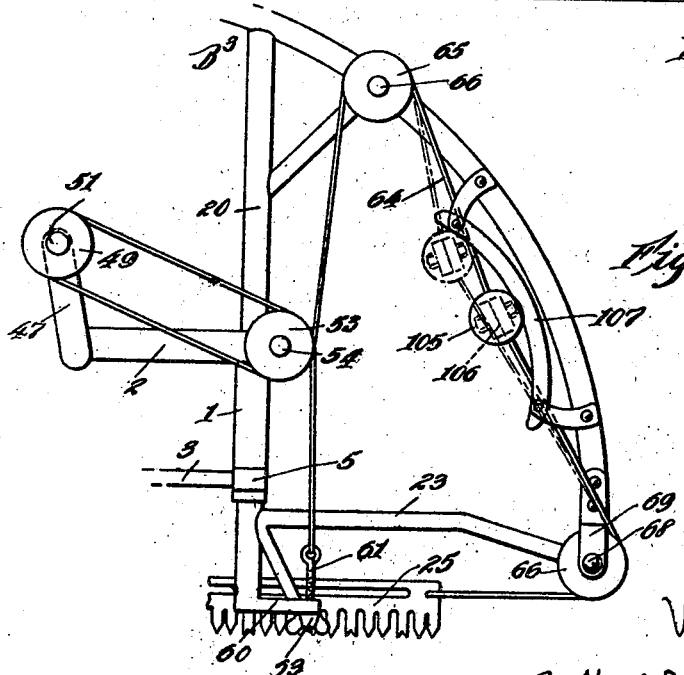

The objects above enumerated and others which will become apparent as this description proceeds are attained in any and all of the various modifications of sawing mechanisms illustrated in the accompanying drawings which form a part thereof, and wherein Figure 1 is a side elevation of a portable power-driven sawing mechanism embodying my invention; Fig. 2 is a right hand end elevation thereof; Fig. 3 is a somewhat enlarged central vertical section, as represented by the line 3—3 of Fig. 1; Figs. 4 and 5 are horizontal sections taken on the lines 4—4 and 5—5 respectively, of Fig. 1; Fig. 6 is an enlarged sectional detail through spring mechanism for controlling the movements of the movable frame with respect to the fixed frame; Fig. 7 is a section on the line 7—7 of Fig. 6; Fig. 8 is a detail, in perspective, of the adjustable means for fastening the fixed frame to a log or like object; Fig. 9 is a side elevation of a modified form of sawing mechanism; Fig. 10 is an enlarged sectional detail on the line 10—10 of Fig. 9; and Figs. 11 and 12 are fragmentary side elevations of further modifications of my invention.

In the form of my invention illustrated in Figs. 1 to 8, A refers generally to what I have already mentioned as the fixed frame, and B to what I have referred to as the movable frame of the sawing mechanism.

The fixed frame A comprises a pair of tubular end members 1 that are preferably square in cross section, as shown in Figs. 4 and 5, and parallel to each other; and these side members are connected together and spaced apart at their upper ends by a beam 2, and at their lower ends by a pair of preferably square rods 3, that have notched or serrated upper faces on each side of the central portions thereof, the serrations being in the form of ratchet teeth, as indicated at 4, with their straight faces presented inward toward the center of the machine. It will be observed, especially from Figs. 3, 4 and 5, that the rods 3 are offset laterally from and connected to the end members 1, by blocks or brackets 5. Upon each of the rods 3, and on each side of its longitudinal center, is mounted a slide 6, and the opposed slides of each rod may be held in any adjusted position against separation by the engagement of the noses of their pawls 7 with the serrations 4 of the rod. The pawls 7 of the slides 6 are pivoted on pins or rivets 8 that extend through ears 9 which rise from the slides. A leg 10 extends downwardly and outwardly from one side of each slide in a position to engage the side of an object, such as a log C, and a dog 11 is pivoted to each leg and the spurs 12 thereof are adapted to be driven into the object C to firmly hold the frame A to the object. Either or both of the rods 3 may have pivoted to it, near its center, a dog 15, as a further means of securing the frame A to the object upon which the saw is to operate. The dogs are so constructed that an instrument may be conveniently inserted between the leg 11 and its free end, for the purpose of prying the spurs thereof out of the object.

It may be explained at this time that where it is desired to saw objects to which the mechanism cannot be easily fastened in the manner just described, such as wooden ties, spiles, and the like, extensions 16, having socketed upper ends for the reception of the legs 10, may be slipped over said legs so that the mechanism may, through such extensions, rest directly upon the ground or floor. Such an alternative is illustrated in Fig. 11.

The adjustability of the slides 6 along the rods 3, makes the mechanism adaptable to objects of various sizes; and the fastening means, constituting the dogs 11 and 15, are sufficiently secure to effectually hold the mechanism in a horizontal plane against a vertical object, such as a standing tree, post, or the like.

The movable saw carrying frame B is made up of a pair of substantially parallel supporting members 20, which are slidable in the end members 1 of the frame A, and a curved member 21 connects the outer ends of said supporting members and extends therebeyond to substantially the plane of the lower ends of such members, the free ends of the members 20 and 21 being rigidly connected by braces 23. The end portion of the curved member 21 is further braced from the supporting members 20, by diagonal members 24.

To the attainment of strength and lightness, I construct the frame B, so far as possible, of tubing; and the inner ends of the supporting members 20 of such frame are provided with notches or grooves in which the saw 25 is guided (it being explained that the side of the mechanism adjacent the object that the saw is to operate upon will, for convenience of description, be referred to as the inner side of the mechanism and the opposite, the outer side thereof.) The back of the saw 25 bears against rollers 26, shown in dotted lines in Fig. 1, and said rollers are journaled upon pins 27, which extend through the side walls of the tubular members 20. Spaced a short distance below the pins 27, and extending through the members 20, are pins 28, preferably of hardened steel, which occupy slots 29 in the saw. These pins are for the purpose of holding the saw against displacement when the saw is removed from an object.

The beam 2 of the frame A is hollow, and is rectangular in cross section, as shown especially in Fig. 7, and adjacent each end thereof, a shaft 30 extends transversely of said beam and has its ends journaled within the side walls thereof. A spring drum 32 is mounted loosely upon each shaft 30, and a spiral spring 33 is contained within each drum and has one of its ends attached thereto, and its opposite end secured to the shaft 30. A ratchet 34 is fastened to the shaft adjacent one of the side walls of the beam 2, and a pawl 35, pivoted to said wall, coöperates with the ratchet to hold the spring 33 under any desired tension to which it may be wound by the application of a suitable crank or key to the squared protruding end of the shaft. A band 37, of any suitable material, has one end secured to the drum and is adapted to wind thereon, the opposite end of the band being provided with a hook 38. Openings are formed in the inner and outer walls of the beam 2, so that the band 37 may be led in either direction from the drum. When the mechanism is used for sawing objects lying in a horizontal position, and therefore requiring the mechanism to stand in a vertical position, the ends of the bands 37 may be passed downward and connected, by their hooks 38, to eyes 39 that are carried by the supporting members 20 near their inner or lower ends. It will be seen from this that the springs 33 overcome, to any desired extent, depending upon their tension, the weight of the supported frame, causing the saw to bear as lightly as desired upon the work. Of course, should more pressure be required, the bands 37 may be unfastened from the movable frame, and the entire weight of the same may be allowed to rest upon the saw, through the rollers 26. Furthermore, should greater pressure be needed than it is possible to obtain from the weight of the frame B, the bands 37 may be reversed and drawn outward or upward from the beam 2 and hooked to the eyes 40 formed within the angle between the members 20 and 21 of the movable frame. When the mechanism occupies a horizontal position, as when attached to vertical objects, the parts are arranged as last described, in order to move the frame B toward the object.

The driving element 45, which, in the present embodiments, is in the form of a shaft, is journaled transversely within the beam 2, at its longitudinal center, and on one side of the beam has connected to it the hub 46 of a crank 47, a cam 48 being formed as a part of the crank and occupying a position between the crank proper and the hub portion which receives the end of the shaft. The purpose of this cam will be presently described. A pair of grooved pulleys 49 and 50 are journaled loosely upon the crank pin 51; and corresponding pulleys 52, 52ª and 53, 53ª are similarly mounted upon stub shafts 54 which are carried by the outer ends of slides 55, that are mounted upon that side of the beam 2 that is adjacent the crank 47. The inner ends of the slides 55 have grooved rollers 56 which traverse the periphery of the cam 48. L-shaped brackets 57 are connected to the slides 55, and one of the branches of one of the brackets 57 extends over the beam 2, and one of the branches of the other extends beneath said beam. Each of said brackets has one end of a tension spring 58 attached to it, while the opposite end of this spring is attached to an ear 59, carried by the beam. These springs tend to move the slides inward and retain the rollers 56 in contact with the cam 48.

A bracket 60 extends laterally from the inner end of each of the members 20 of the frame B, and the shank of an eye bolt 61 extends through a boss 62 thereof, and is adjustable therein by means of a thumb nut 63 that is applied to the eye bolt. A flexible member 64, such as a cable, has one of its ends secured to the eye bolt, and the bracket 60 is so positioned as to direct the cable 64, with practically no divergence, into the groove of the roller 52, it being here explained that both ends of the mechanism are the same, and that the description of one end (the left hand end in the present instance, as viewed in Fig. 1) will be sufficient to convey a clear understanding of the construction and arrangement of both. After passing over the pulley 52, the cable is passed about the pulley 49 of the crank 47, and is then carried back and around the pulley 52ª, which is journaled on the same pin 54 as the pulley 52. From here the cable is carried out over a sheave 65 that is supported upon a stud 66, extending laterally from the curved member 21 of the frame B, and thence over a sheave 67, journaled upon a stub shaft 68, that is mounted in the lower end of the curved member 21 and in a Z-bracket 69 that is attached to the side of the member 21. From the end elevation of the machine, as shown in Fig. 2, it will be observed that the curved member 21 is turned slightly to one side in order to bring the sheave 67 into alinement with the saw 25. After being carried around the sheave 67, the cable is fastened to the adjacent end of the saw. The sheaves, etc., at the right hand end of the mechanism, which corresponds to those just described in connection with the left hand end, bear like reference characters. The cable 64 may be tightened through the adjustment of the thumb nut 63, sufficiently to prevent the cable from becoming disengaged from any of the pulleys over which it is trained.

While I may employ various means for driving the shaft 45 (such as an electric motor which may be separate from or constitute a part of the mechanism, the latter embodiment being shown in Fig. 11) I prefer to obtain my power from a portable engine, and transmit the power to the sawing mechanism through a flexible shaft, reducing the engine speed to what is required for the saw. A principle peculiar to flexible shafts, and well known to those familiar with the subject, is that, in the transmission of a given power, the size of the shaft is inversely proportionate to its speed. Therefore, in order to use a comparatively small flexible shaft, such having its obvious advantages, I transmit the power, at the speed of the engine, through the flexible shaft D, to a stub shaft 71, journaled in the frame A below the shaft 45, and having a pinion 72. Directly above the pinion 72, a large gear 73 is fastened to the shaft 45, and an endless chain extends about the pinion and gear and transmits power from the former to the latter at a reduced speed. Upon the rotation of the shaft 45, the loop in one of the cables 64 (which is formed by reason of the cable being guided over the pulleys carried by the slide 55, and one of the pulleys of the crank, is lengthened, assuming of course that the crank is turned away from the side of the mechanism which supports such cable. Simultaneously, the loop of the other cable is allowed to shorten. Therefore, as the driving element is rotated, a quantity of one of the cables is drawn in or accumulated while a like quantity of the other is paid out, such condition being rapidly and continuously reversed, thereby imparting a reciprocatory movement to the saw.

It will appear upon studying the nature of the mechanical movement involving the rotary driving element, the reciprocable element, and the flexible power transmitting members, in their arrangement as herein shown and described, that the effective lengths of the flexible members vary as the crank or driving element swings from its vertical to its horizontal position, (considering, the mechanism for the purpose of this description, that is standing in a vertical position). To compensate for the variations in the effective lengths of the flexible members or cables, I provide the mechanism comprising the slides 55, rollers 56, cam 48, etc. It will be seen, upon the swinging of the crank 47 from a vertical to a horizontal position, (it being remembered that the cam is fixed with respect to the crank) that the rollers 56, and consequently the slides 55, will be separated to move the pulleys 52, 52ª and 53, 53ª farther apart in order to take in or accumulate an amount of cable equal to the difference between the effective lengths of the cables, when the crank is in its vertical and when it is in its horizontal positions.

The inner and outer sides of each of the end members 1 of the frame A are notched upward from their lower ends a sufficient distance to allow the frame B to be elevated until the teeth of the saw are above the plane of the rods 3, one of the notches appearing in dotted line at 1ª in Fig. 3, the notches on the outer sides of said members accommodating the braces 23, and on the inner sides, the eyes 39. When the mechanism is not in use, the movable frame may be supported with the saw withdrawn above the plane of the bars 3, or at any other desired elevation, by engaging the pawl 75, pivoted to the beam 2 of the fixed frame, with one of the teeth of a ratchet rack 76, formed on the right hand member 20 of the frame B.

In Fig. 9 I have illustrated a modified and more compact form of my sawing mechanism, the same comprising, generally, the fixed frame A', and the movable frame B'. The former is substantially identical with the frame A of the previous modification. The frame B' comprises the supporting elements 80, which are guided through the end members 81 of the fixed frame, and the outer ends of which are spaced apart and connected by a member 82. The lower ends of the members 80 are notched or slotted for the guidance of the saw 83, and the saw is held against removal from such slots or grooves, by pins 84, which occupy the slots 85, formed in the saw. The back of the saw is provided with gear teeth, constituting a rack, which meshes with a pinion 86 that is fixed to a shaft 87 that extends through each of the tubular members 80. Beyond one side of each tubular member, its respective shaft has a drum 88 fastened to it, and a cable 89 is attached to and wound upon said drum, the free end of the cable passing from said drum, over the pulleys 90, 91, etc., which correspond, precisely, to the pulleys 52, 49, etc., respectively, of the former modification of the mechanism, and the free end of the cable is secured to an eye bolt 92 that is adjustable, by means of the thumb nut 94, within an ear 93 that extends laterally from the upper end of the frame B'.

From the foregoing description it will be seen that, upon the rotation of the driving element 95, of the present form of my invention, the drums 88 will be rotated first in one direction and then the other, to drive, through the pinions 86, the saw 83. In this, as in my former modification, the saw is drawn through the work. This I prefer to do, for it allows me to use thin blades; but it is obvious that in the later modification, should it be desired, the saw might be driven through the work by simply reversing the direction in which the cables are wound upon the drums 89.

Fig. 11 shows a modification of my invention which corresponds quite closely to the form shown in Fig. 1, the principal change being a simplification of the compensating mechanism for taking care of the differences in the effective lengths of the cables, as the driving element swings through various angles from a vertical to a horizontal position. Inasmuch as the generalities of the two forms are the same, the same reference numerals will be applied to their corresponding elements. Departing from the former style, the modification now under discussion has a cam track 100 supported within the angle between each of the braces 23, and the adjacent member 20 of the supported frame, which, in the present instance, is designated B². A roller 101, journaled between the branches of a clevis 102, traverses the inner edge of the track 100 when the clevis is moved by reason of its connection, through the cable 103, with the span of the cable 64, between the sheaves 65 and 66 (it being explained that, when the crank is in its vertical position, the roller 101 should occupy substantially the center of its movement along the track 100 and the cable 103 should extend at substantially right angles from the cable 64). As the crank swings from its vertical toward its horizontal position, the aforesaid span of the cable 64 will be drawn inward by the cable 103, as indicated in dotted lines, thereby to take up the slack within the cable.

Substantially the same result is accomplished through the compensating means illustrated in Fig. 12 wherein a roller 105, journaled to a member 106 that is fastened to the span of the cable 64 between the sheaves 65 and 66, traverses the cam track 107, carried by the end portion of the curved member 21 of the frame B³.

Having thus described my invention, what I claim is:—

1. In a mechanical movement, a reciprocable element, a flexible member having a part in operative connection with said element and a part remote therefrom held at a point fixed with respect to the path of reciprocation of said element, guides over which said member is led to form a loop intermediate said parts, and a rotary driving element having a member engaging portion that is eccentric with respect to its rotating axis, and over which the aforesaid loop is engaged.

2. In a mechanical movement, a reciprocable element, a flexible member having a part in operative connection with said element and a remote part anchored at a point fixed with respect to the path of reciprocation of said element, guides over which said member is led to form a loop intermediate said parts, a rotary driving element having a guide eccentrically mounted with respect to the rotating axis of said element and over which the aforesaid loop is engaged thereby to move the reciprocable element in one direction when the driving element is rotated, and means for moving the reciprocable element in the opposite direction.

3. In a mechanical movement, a reciprocable element, a pair of opposed flexible members each having a part in operative connection with the reciprocable element and a remote part anchored at a point fixed with respect to the path of reciprocation of said element, guides over which said members are led to form a loop in each intermediate the aforesaid parts, and a rotary driving element having guides arranged eccentrically of its axis of rotation and over which the loops of the aforesaid members are engaged.

4. In a mechanical movement, a reciprocable element, a pair of opposed flexible members each having one of its ends attached to the reciprocable element and its other end anchored at a point fixed with respect to the path of reciprocation of said element, guides over which each of said members is led to form a loop, a rotary driving element having guides arranged eccentrically of its axis of rotation and over which the aforesaid loops are engaged, the distance between the first mentioned guides being less than the maximum throw of the guides of the driving element, and means for maintaining the flexible members substantially taut during the rotation of the driving element.

5. In mechanism of the character set forth, the combination of a frame, an element reciprocably carried by said frame, a pair of opposed flexible members each having one of its ends in operative connection with said element and its opposite end attached to the frame, and mechanism carried by the frame for taking in or accumulating a part of one member while paying out a like quantity of the other and for continuously reversing such condition.

6. In apparatus of the character set forth, the combination of a frame, an element reciprocably carried by said frame, a pair of opposed flexible members each having one of its ends in operative connection with said element and its opposite end attached to the frame, a second frame movably supported by the first, and mechanism carried by the second frame for taking in or accumulating a part of one member while paying out a like quantity of the other and for continuously reversing such condition, such mechanism permitting relative movement between the frames while said mechanism is operating.

7. In apparatus of the character set forth, the combination of a frame that is adapted to be supported in fixed relation to an object to be acted upon, a second frame supported by the first and movable with respect thereto toward the object, an element adapted to operate upon the object and reciprocably carried by the second frame, opposed flexible members each having one of its ends attached to said element and its opposite end anchored to the second frame in fixed relation to the path of reciprocation of the aforesaid element, and mechanism carried by the first frame for taking in or accumulating a part or quantity of one member while paying out a like quantity of the other and for continuously reversing such condition.

8. In mechanism of the character set forth, the combination of a frame that is adapted to be supported in fixed relation to an object to be operated upon, a second frame supported by the first and movable toward said object, an element adapted to operate upon the object and reciprocably supported by the second frame, a pair of opposed flexible members each having one of its ends attached to said element and its opposite end anchored to the second frame in fixed relation to the path of reciprocation of the aforesaid element, guides over which the opposed flexible members are led to form a loop in each, a driving element rotatably supported by the first mentioned frame and having a pair of guides located eccentrically of its axis of rotation and over which the loops of the opposed flexible members are engaged, and compensating means for taking care of the variations in the effective lengths of the flexible members as the driving element passes through the various angles of its rotation.

9. In apparatus of the character set forth, the combination of a frame that is adapted to be supported in fixed relation to an object that is to be operated upon, a second frame supported by the first and movable toward said object, an element reciprocably supported by the second frame and adapted to operate upon the object, driving mechanism carried by the first frame, and operative connections between said mechanism and the aforesaid element, said connections, while operating, permitting relative movement between the frames.

10. In apparatus of the character set forth, the combination of a frame that is adapted to be supported in fixed relation to an object that is to be operated upon, a second frame supported by the first and movable toward said object, an element carried by the second frame and adapted to operate upon the object, mechanism for driving said element, and adjustable connections between the two frames whereby the aforesaid element may be caused to bear with varying degrees of pressure upon the object.

11. In mechanism of the character set forth, the combination of a frame that is adapted to be supported in fixed relation to an object to be operated upon, a second frame supported thereby and movable toward said object, an element that is adapted to operate upon said object and reciprocably carried by the second frame, a pair of opposed flexible members each having one of its ends in operative connection with the reciprocable element and its opposite end anchored to the second frame in fixed relation to the path of reciprocation of the aforesaid element, a driving element rotatably supported by the first frame, a cam fixed with respect thereto, a pair of shiftable members between which said cam operates, thereby to move the members toward and from each other as the cam rotates, a pair of guides carried by each of the shiftable members and over which one of the aforesaid flexible members is trained to form a loop, the driving element having a pair of guides that are mounted eccentrically of its axis of rotation and with which the aforesaid loops engage.

12. In mechanism of the character set forth, the combination of a reciprocable element, a pair of opposed flexible members each having one of its ends in operative connection with the reciprocable element and its opposite end anchored at a fixed point with respect to the path of reciprocation of said element, a rotary driving element, a cam fixed with respect thereto, a pair of shiftable members between which said cam operates thereby to move the members toward and from each other as the cam rotates, a pair of guides carried by each of the shiftable members and over which one of the aforesaid flexible members is trained to form a loop, the driving element having a pair of guides that are mounted eccentrically of its axis of rotation and with which the aforesaid loops engage.

13. In apparatus of the character set forth, the combination of a frame comprising a pair of tubular end members that are connected and spaced apart at one end by a pair of rods having serrated surfaces, slides mounted upon said rods a pawl carried by each slide for coöperation with the serrations of the rod to hold the slide against movement in one direction, means attached to each slide for maintaining the frame in fixed relation to an object, a second frame comprising supporting members that are slidable within the tubular end members of the first frame and a member which connects the corresponding ends of the supporting members, an element that is adapted to operate upon the object and reciprocably supported by the free ends of the supporting members of the second frame, driving mechanism carried by the first frame, and operative connections between said mechanism and the reciprocable element.

14. In apparatus of the character set forth, the combination of a frame comprising a pair of tubular end members that are connected and spaced apart at one end by a beam, and at the other by a pair of rods located on opposite sides of the plane of the end members, means adjustable along said rods for maintaining the frame in operative relation to an object, a second frame comprising supporting members that are slidable within the tubular end members of the first frame and a curved member which connects the corresponding ends of the supporting members and extends therebeyond to substantially the plane of the opposite ends of the supporting members, braces connecting the free end of each supporting member with the adjacent end of the curved member, an element that is adapted to operate upon the object and reciprocably supported by the free ends of the supporting members of the second frame, driving mechanism carried by the first frame, and operative connections between said mechanism and the reciprocable element.

15. In apparatus of the character set forth, the combination of a frame comprising a pair of tubular end members, means for maintaining the frame in fixed relation to an object, a second frame comprising supporting members that are slidable within the tubular end members of the first frame and a curved member which connects the corresponding ends of the supporting members and extends therebeyond to substantially the plane of the opposite ends of the supporting members, an element that is adapted to operate upon the object and reciprocably supported by the free ends of the supporting members of the second frame, a driving element rotatably supported by the first frame, a pair of guides supported upon each end of the first frame, the driving element having a pair of guides mounted eccentrically of its axis of rotation, the curved member of the second frame being provided with a guide at each of its ends and a guide near the junction of said member with each of the aforesaid supporting members, opposed flexible members each having one of its ends anchored to the free end of one of the supporting members of the second frame and trained over the guides of the first frame to form a loop that is engaged about one of the guides of the driving element, the flexible member further extending over one of the second mentioned guides of the second frame and thence over the adjacent first mentioned guide thereof and having connection with one end of the reciprocable element.

16. In apparatus of the character set forth, the combination of a frame comprising a pair of tubular end members that are connected and spaced apart at one end by a beam, and at the other by a pair of rods located on opposite sides of the plane of the end members, means adjustable along said rods for maintaining the frame in fixed relation to an object, a second frame comprising supporting members that are slidable within the tubular end members of the first frame and a curved member which connects the corresponding ends of the supporting members and extends therebeyond to substantially the plane of the opposite ends of the supporting members, braces connecting the free end of each supporting member with the adjacent end of the curved member, an element that is adapted to operate upon the object and reciprocably supported by the free ends of the supporting members of the second frame, a driving element rotatably supported by the beam of the first frame, a pair of guides supported upon each end of the first frame, the driving element having a pair of guides mounted eccentrically of its axis of rotation, the curved member of the second frame being provided with a guide at each of its ends and a guide near the junction of said member with each of the aforesaid supporting members, opposed flexible members each having one of its ends anchored to the free end of one of the supporting members of the second frame and trained over the guides of the first frame to form a loop that is engaged about one of the guides of the driving element, the flexible member further extending over one of the second mentioned guides of the second frame and thence over the adjacent first mentioned guide thereof and having connection with one end of the reciprocable element.

17. In apparatus of the character set forth, the combination of a frame, means for supporting the frame in fixed relation to an object, a second frame supported by the first frame and movable toward the object, an element that is adapted to operate upon the object and reciprocably supported by the second frame, a driving element rotatably supported by the first frame, a pair of guides supported upon each end of the first frame and in substantially a common plane with the axis of rotation of the driving element, the driving element having a pair of guides mounted eccentrically of its axis of rotation, opposed flexible members each having one of its ends anchored to the second frame and trained over the guides of the first frame to form a loop that is engaged about one of the guides of the driving element, the flexible member further having operative connection with the reciprocable element, slides carried by the first frame and supporting, at their outer ends, the aforesaid guides thereof, said slides having opposed cam engaging members, a cam for coöperation therewith that is fixed with respect to the driving element, whereby the guides of the first frame are moved toward and from each other as the driving element rotates.

18. In apparatus of the character set forth, the combination of a frame comprising a pair of tubular end members, means for maintaining the frame in operative relation to an object, a second frame comprising supporting members that are slidable within the end members of the first frame, means rigidly connecting the corresponding ends of the supporting members, an element reciprocably supported by the opposite ends of the supporting members, driving mechanism carried by the first frame, and operative connections between said mechanism and the reciprocable element.

19. In apparatus of the character set forth, the combination of a frame comprising a pair of tubular end members that are connected and spaced apart at one end by a beam, and at the other by a pair of rods located on opposite sides of the plane of the end members, means adjustable along said rods for maintaining the frame in fixed relation to an object, a second frame comprising supporting members that are slidable within the end members of the first frame, means rigidly connecting the corresponding ends of the supporting members, an element reciprocably supported by the opposite ends of the supporting members, a driving element rotatably supported by the beam of the first frame, said element having guides that are eccentric of its axis of rotation, a pair of guides carried by and located at each end of the first frame, and a pair of opposed flexible members each having one of its ends in operative connection with the reciprocable element and its opposite end fixed to the second frame, each of said members, intermediate its ends, being trained over the guides at one end of the first frame thereby to form a loop that is engaged over one of the guides of the driving element.

20. In apparatus of the character set forth, the combination of a frame comprising a pair of tubular end members and having means for supporting it in fixed relation to an object to be operated upon, a second frame having supporting members that are slidable through the end members of the first frame, the end of each of the supporting members adjacent the object having a notch that is in the plane of the notch of the other supporting member, a blade that is guided within said notches in a position to operate upon the object, a member carried by and extending through each supporting member, the blade having a slot through which said member extends thereby to retain the blade against displacement, driving mechanism carried by the first frame, and operative connections between said mechanism and the blade.

21. In apparatus of the character set forth, the combination of a frame comprising a pair of blade supporting members that are spaced apart, means for supporting the frame in operative relation to an object to be operated upon, each of the aforesaid blade supporting members having a notch in its end adjacent the aforesaid object that is in the plane of the notch of the other member, a blade reciprocably supported within said notches, means extending through each supporting member and bisecting the notch thereof, the blade having a longitudinal slot through which said means extends, driving mechanism supported by the frame, and operative connections between said driving mechanism and the blade.

22. In apparatus of the character set forth, the combination of a frame having means for supporting it in fixed relation to an object to be operated upon, a second frame supported by the first and movable toward the object, an element reciprocably supported by the second frame and adapted to operate upon the object, driving mechanism supported by the first frame, operative connections between said driving mechanism and the reciprocable element, adjustable tension means carried by the first frame, and connections between said tension means and the second frame whereby the same may be caused to move with varying degrees of force toward the object.

23. In apparatus of the character set forth, the combination of a frame having means for supporting it in fixed relation to an object to be operated upon, a second frame supported by the first and movable toward the object, an element reciprocably supported by the second frame and adapted to operate upon the object, driving mechanism supported by the first frame, operative connections between said driving mechanism and the reciprocable element, and coöperating elements carried one by the first frame and the other by the second for holding the frames at various adjusted positions with respect to each other.

24. In mechanism of the character set forth, the combination of a frame that is adapted to be supported in fixed relation to an object to be operated upon, a second frame supported by the first and movable toward said object, an element adapted to operate upon the object and reciprocably supported by the second frame, said element being provided with a rack, a pair of pinions rotatably supported by the second frame and meshing with remote parts of said rack, a drum fixed with respect to each pinion, a pair of opposed flexible members each having one of its ends attached to one of said drums and adapted to wind thereon, and its opposite end anchored to the second frame in fixed relation to said drum, guides over which the opposed flexible members are led to form a loop in each, and a driving element rotatably supported by the first mentioned frame and having a pair of guides located eccentrically of its axis of rotation and over which the loops of the opposed flexible members are engaged.

25. In apparatus of the character set forth, the combination of a frame that is adapted to be supported in fixed relation to an object that is to be operated upon, a second frame supported by the first and movable toward the said object, an element carried by the second frame and adapted to operate upon the object, mechanism for driving said element, and means adapted to actively impel the second frame toward the object.

In testimony whereof, I hereunto affix my signature.

WARD B. MILLER.